(12) United States Patent
Doyle et al.

(10) Patent No.: US 12,526,263 B2
(45) Date of Patent: Jan. 13, 2026

(54) METHOD FOR SECURE ACCESS TO DIGITAL DATA

(71) Applicant: MailSPEC LLC, Las Vegas, NV (US)

(72) Inventors: Jon Doyle, Nice (FR); Freddy Frouin, Parthenay (FR)

(73) Assignee: MailSPEC LLC, Las Vegas, NV (US)

( * ) Notice: Subject to any disclaimer, the term of this patent is extended or adjusted under 35 U.S.C. 154(b) by 60 days.

(21) Appl. No.: 18/115,977

(22) Filed: Mar. 1, 2023

(65) Prior Publication Data

US 2023/0283467 A1  Sep. 7, 2023

(30) Foreign Application Priority Data

Mar. 3, 2022 (FR) ..................... 2201865

(51) Int. Cl.
| | |
|---|---|
| H04L 9/40 | (2022.01) |
| G06F 21/30 | (2013.01) |
| G06F 21/62 | (2013.01) |
| H04L 9/30 | (2006.01) |

(52) U.S. Cl.
CPC .............. H04L 63/08 (2013.01); G06F 21/30 (2013.01); G06F 21/62 (2013.01); H04L 9/30 (2013.01); H04L 63/0442 (2013.01)

(58) Field of Classification Search
CPC ....... H04L 63/08; H04L 9/30; H04L 63/0442; H04L 9/0894; H04L 9/3231; H04L 9/3234; H04L 63/0853; H04L 63/0861; G06F 21/30; G06F 21/62; G06F 21/32; G06F 21/6209; G06F 21/34
See application file for complete search history.

(56) References Cited

U.S. PATENT DOCUMENTS

| | | | |
|---|---|---|---|
| 5,604,801 A | 2/1997 | Dolan et al. | |
| 9,887,975 B1* | 2/2018 | Gifford | H04W 12/0431 |
| 11,025,598 B1* | 6/2021 | Laghaeian | H04L 63/0435 |
| 2002/0178366 A1 | 11/2002 | Ofir | |
| 2012/0159612 A1* | 6/2012 | Reisgies | G06F 21/41 |
| | | | 726/18 |
| 2014/0068279 A1* | 3/2014 | Kurspahic | H04L 9/0894 |
| | | | 713/193 |
| 2018/0083959 A1* | 3/2018 | Barbosa | H04W 12/068 |
| 2018/0145830 A1* | 5/2018 | Henretty | H04L 9/3263 |

* cited by examiner

Primary Examiner — Henry Tsang
(74) Attorney, Agent, or Firm — McConnell Law Firm PC; Robert McConnell

(57) ABSTRACT

The invention relates to a method for secure access to digital data, said digital data being encrypted with a given user's public encryption key and stored on a server. The method comprises the following steps:

A. receiving at said server a request from said user to access said digital data;
B. transmitting, via said server, via a secure communication interface, a request to a secure user device to release a password stored on said user device;
C. obtaining said password via said secure communication interface, from said user device in response to a validated security test issued by said user device to a user; and
D. retrieving, via said server, the user's encrypted private key, said user's private key being encrypted with said password, and decrypting said user's encrypted private key with said password to obtain that user's private key, and decrypting said encrypted digital data with said user's private key, and presenting said digital data to said user.

16 Claims, 3 Drawing Sheets

METHOD FOR SECURE ACCESS TO DIGITAL DATA

FIELD OF THE INVENTION

The technical field of the present invention relates to the field of access to digital data, and in particular, access to digital data being encrypted with an encryption key.

PRIOR ART

Email encryption is difficult to achieve because it forces users of a system to exchange encryption keys and use passwords that can often be complex and/or compromised by cyber attacks or hacking. Indeed, a user password generally consists of eight simple characters that take from two to 21 days to decrypt, depending on the complexity of the password. Moreover, the more complicated the password, the more difficult it is for users to remember it. In addition, passwords and encryption keys are stored on a server that can be accessed by the system administrator or data centre personnel. There are open source systems using Pretty Good Privacy (PGP) encryption technology. However, due to their complexity, these are rarely used.

SUMMARY OF THE INVENTION

The invention improves the situation by offering a method of secure access to digital data, with said digital data being encrypted with a given user's public encryption key and stored on a server, and said method comprising the following steps:
  A. receiving at said server a request from said user to access said digital data;
  B. sending, by said server via a secure communication interface, a request to a secure user device to release a password stored on said user device;
  C. obtaining said password via said secure communication interface, from said user device in response to a validated security test issued by said user device to a user; and
  D. retrieving, via said server, the said user's encrypted private key which is encrypted with said password, and decrypting said user's private key encrypted with said password to obtain said user's private key, and decrypting said encrypted digital data with said user's private key, and presenting said digital data to said user.

In one implementation, wherein step A consists of logging in, the method comprising a subsequent step of deleting said private key and password from a memory of said server when the session is considered to be finished.

In addition, the invention improves the situation by offering a method of secure access to digital data, with said digital data being encrypted with a given user's public encryption key and stored on a server, and said method comprising the following steps:
  A. receiving at a secure user device via a secure communication interface a request to release a password stored on a user device, said request being sent in response to receiving at said server a request from said user to access said digital data;
  B. sending, by said secure device, a security test to a user thereof, and in response to a validated security test, releasing by said secure user device said password to said secure communication interface for retrieval by said server, said password being used in decrypting an encrypted private key to obtain the private key of said user, and decrypting said encrypted digital data with said private key of said user, for presenting said digital data to said user.

In one implementation, said step of issuing a security test by said secure user device comprises comparing a biometric input with biometric data associated with the said user stored on said secure user device, wherein said validated security test consists of determining whether said biometric input satisfies a predefined similarity criterion with respect to said biometric data associated with said user.

In one implementation, the password is stored in a secure chip of said secure user device.

In one implementation, said secure communication interface implements an SSL/TLS session via an application executed on said secure user device.

In one implementation, said secure communication interface performs further encryption and decryption of communications with a shared secret known to said secure user device and said interface.

In one implementation, the method consists of an additional step, prior to step A, which consists of transferring said shared secret to said secure user device.

In one implementation, said step of transferring said shared secret to said secure user device comprises scanning an optically, magnetically or wireless readable code.

In one implementation, said public encryption key of said determined user and said private key of said determined user comply with the S/MIME standard and are defined by an S/MIME certificate.

In one implementation, said digital data comprises a primary encryption key, and is further associated with primary data encrypted with said primary encryption data, said method comprising a subsequent step of decrypting said primary encryption data with said primary encryption key.

In one implementation, said digital data is further associated with an encrypted copy of said primary encryption key, said encrypted copy of said primary encryption key being encrypted with an escrow password.

Furthermore, the invention improves the situation by offering a computer programme product comprising instructions which, when the programme is executed by a computer, cause the computer to implement the method of the preceding implementations.

In one implementation, before said step A, said secure communication interface sends said password to said secure user device via a secure channel.

In addition, the invention improves the situation by offering a system allowing secure access to digital data, with said digital data being encrypted with a given user's public encryption key, and the system comprising:
  a destination unit configured to receive the digital data;
  a server configured to store the public encryption key of the user and receive a request from said user to access said digital data;
  a user device configured to store a password;
  a secure communication interface configured to issue a request to the secure user device to release the password and obtain said password from said user device in response to a validated security test issued by said user device to a user, wherein the server is configured to retrieve an encrypted private key of said user, said encrypted private key of said user being encrypted with said password, and decrypt said user's private key encrypted with said password to obtain the private key of said user, and decrypt said encrypted digital data with said user's private key, and present said digital data to said user.

In addition, the invention improves the situation by offering a system allowing secure access to digital data, with said digital data being encrypted with a given user's public encryption key, and the system comprising:
- a server configured to store the user's public encryption key; and
- a secured user device configured to receive via secure communication interface a request to release a password stored on said user device, said request being sent in response to receiving at said server a request from said user to access said digital data, send a security test to a user thereof, and in response to the validated security test, to release said password to said secure communication interface for retrieval by said server, said password being used in the decryption of an encrypted private key to obtain the private key of said user, and the decryption of said digital data encrypted with said user's private key, for the presentation of said digital data to said user.

It is further proposed to provide a method for secure access to digital data enabling simple configuration and use, as well as simple integration with non-compliant systems.

BRIEF DESCRIPTION OF THE DRAWINGS

Other characteristics, details and advantages of the invention will become apparent on reading the description given with reference to the appended drawings given by way of example and which represent, respectively.

DETAILED DESCRIPTION

Figure 1:
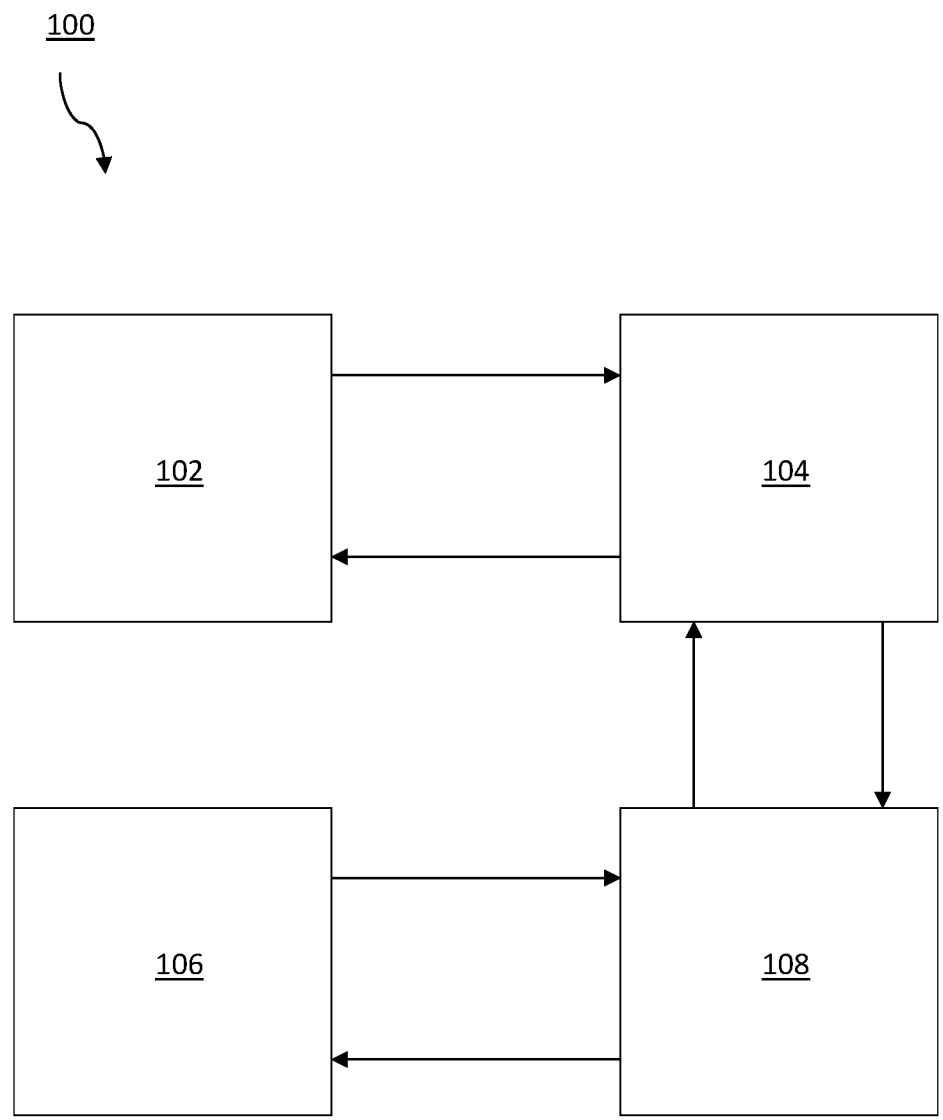
FIG. 1 is a schematic representation of an example of a system allowing secure access to digital data.

FIG. 1 illustrates an example of system 100 allowing secure access to digital data. Digital data is encrypted with a user's public encryption key. The digital data may, for example, be emails. The user's public encryption key may, for example, comply with the S/MIME standard and be defined by an S/MIME certificate. The system 100 comprises a destination unit 102, a server 104, a secure communication interface 108 and a user device 106.

The destination unit 102 may, for example, be a computer of a user making it possible to access one or more electronic mailboxes. A computer includes desktops and laptops, smart phones, tablets and even smart watches. Alternatively, the destination unit 102 may be an application on a user's computer, tablet or telephone, such as a smart phone, making it possible to access one or more mailboxes. For example, a first user may receive one or more emails from a second user that are encrypted with the first user's public key.

The server 104 may be, for example, a computer or a group of computing devices. For example, the server may be a host computer, a group of computers, or a group of servers operating as a unit. In one example, the server 104 may be a database server coupled to a web server. The server 104 may be coupled to a database and may include any hardware, software, other logic or combination of the foregoing to respond to requests from one or more computers. The server 104 may use a variety of computer structures, layouts, and compilations to respond to requests from one or more user computers.

The user's public encryption key is stored on the server 104. Thus, in order to access his digital data, the user sends a request to the server 104. For example, when the first user receives one or more emails from the second user that are encrypted with the first user's public key, the first user sends a request to the server 104 in order to access his emails. In addition, or alternatively, receipt of the request by the server 104 may constitute logging in.

The secure user device 106 may be a mobile device, for example a smart phone, a laptop, a tablet, or a smart watch. In another example, the secure user device 106 and the destination unit 102 may be the same apparatus comprising an application for accessing a mailbox and an application for storing and releasing a password. The password is randomly generated from the user device 106. Thus, by being randomly generated, this means that it cannot be guessed with knowledge about the user (unlike passwords usually including a date of birth, the name of the person's dog, his favourite sports team, etc.).

The secure user device 106 making it possible to store and release a password makes it possible to access the secure communication interface 108. For example, the secure communication interface 108 may be a third-party server enabling a password to be transferred securely. In another example, the secure communication interface 108 implements an SSL/TLS session via an application executed on the secure user device 106 enabling a password to be transferred in a secure manner. When the secure user device 106 sends a request to the server 104, the server 104 sends a request to the secure communication interface 108 which in turn sends a request to the secure user device 106 to release a password stored on the secure user device 106. For example, the secure user device 106 may comprise a memory for storing the password. In another example, the password may be stored in a secure chip of the secure user device 106 which may be a cryptographic chip integrated into the motherboard of the secure user device 106. In one example, the secure communication interface 108 previously transmits the password to the secure user device 106 via a secure channel in order to be stored in the secure user device 106. For example, the secure communication interface 108 and the secure user device 106 can communicate by encrypting the password for each other using a session key.

A security test issued by the secure user device 106 is used to release the password. For example, the user device 106 may include a device for generating biometric data such as a fingerprint, facial recognition, iris scan, or voice analysis sensor. The secure user device 106 can ask the user to enter his biometric data, for example his fingerprint, by placing his finger on the biometric sensor using his mobile phone. In another example, the biometric data may be a facial recognition or a vital sign such as the user's pulse or breathing. The secure user device 106 verifies that the fingerprint corresponds to that of the user. For example, the secure user device 106 may store biometric data associated with one or more users in order to compare them with the biometric data generated during the security test. The test is validated when the secure user device 106 determines that the biometric input satisfies a predefined similarity criterion with respect to the biometric data associated with the user. For example, the similarity criterion may correspond to a similarity threshold between the biometric input and the biometric data associated with the user.

If the test is validated by the secure user device 106, the password is obtained via the secure communication interface 108, from the secure user device 106. The password is then transmitted to the server 104. The server 104 retrieves the user's private key, which is encrypted with the password. For example, the server 104 may include a memory for storing private keys corresponding to different users and encrypted with passwords stored in the secure user device 106. The server 104 can then decrypt the user's private key with the password. Once the key has been decrypted, the server 104 can decrypt the digital data and transmit it to the destination unit 102. The user can then access his digital data. For example, the user can access his emails. In one example, the user's encrypted private key may conform to the S/MIME standard and be defined by an S/MIME certificate.

In one example, the digital data consists of a primary encryption key, and is further associated with primary data encrypted with the primary encryption data. Primary encryption data may be decrypted with the primary encryption key. For example, the digital data may further be associated with an encrypted copy of the primary encryption key, the encrypted copy of the primary encryption key being encrypted with an escrow password. In particular, two different keys (e.g., the private primary key held in escrow and the user's private encryption key) can be used to decrypt the digital data. For example, digital data can be encrypted with the primary encryption key (which is itself separately encrypted with an escrow password) and with the user's private key. Thus, in one example, the private primary key that makes it possible to decrypt the digital data is stored in escrow and the user's private key is stored on the server 104.

In one example, the secure communication interface 108 further performs encryption and decryption of the communications with a shared secret known to the secure user device 106 and the secure communication interface 108. For example, the transmission of the password between the secure user device 106 via the communication interface 108 and the server 104 can be encrypted and decrypted by the shared secret. The shared secret may be, for example, a secret phrase, a password, a large number or a random sequence of bits. In one example, before receiving the request at a secure user device 106 via a secure communication interface 108 to release the password on the destination unit 102, the shared secret may be transferred to the secure user device 106. For example, the transfer of the shared secret to the secure user device 106 may comprise the scanning of an optical, magnetic or wireless-readable code. In another example, the secure communications interface 108 or the secure user device 106 may generate the shared secret and transfer it to the secure user device 106 or the secure communications interface 108, respectively. Moreover, the transfer of the shared secret to the secure user device 106 can be carried out by the server 104, which sends a request to the destination unit 102 to release the password which is then transmitted to the user device 106, via the secure communication interface 108.

Figure 2:
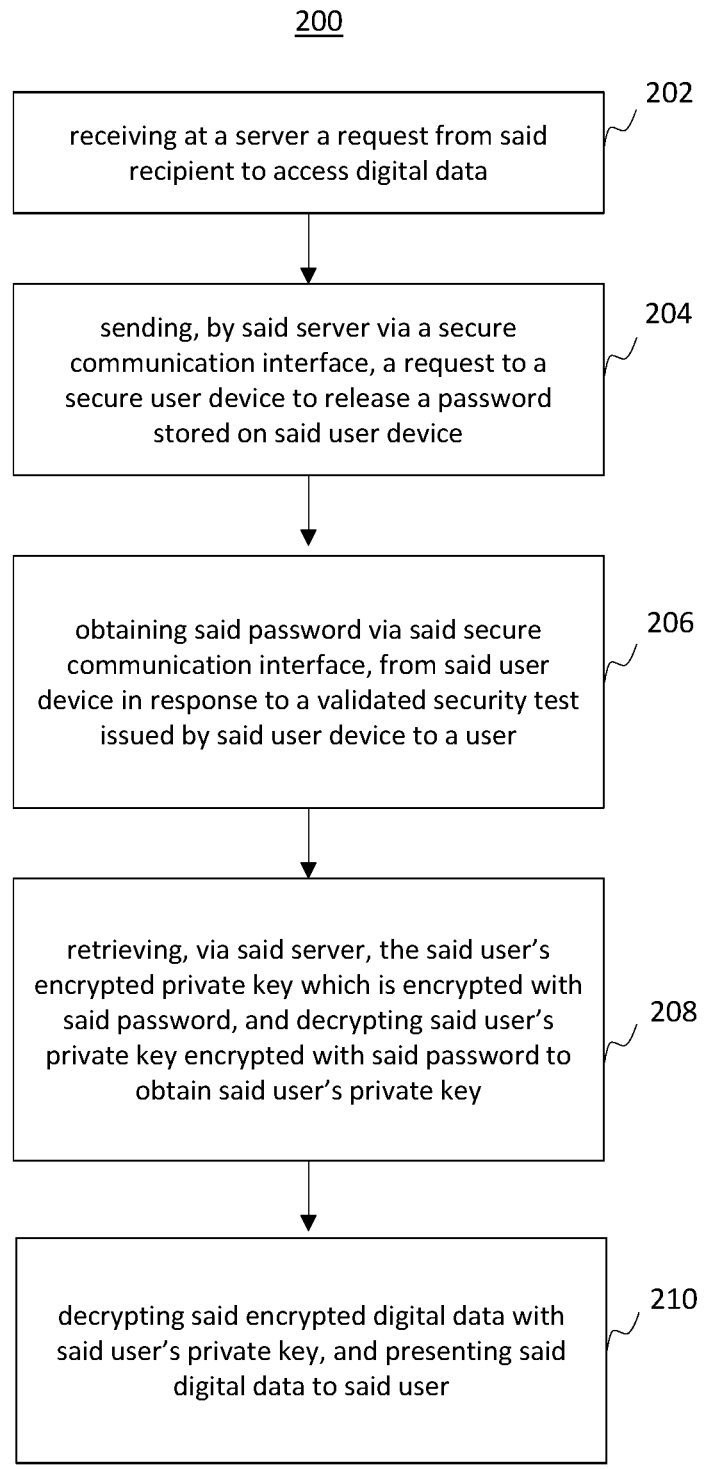
FIG. 2 shows an example of a method for secure access to digital data.

FIG. 2 illustrates a method 200 for secure access to digital data. The digital data is encrypted with a given user's public encryption key and stored on a server. For example, the method 200 may be implemented by the system 200 described above.

At block 202, method 200 comprises receiving at server 104 a request from the user to access the digital data. For example, a user can send a request from his computer or his mobile phone to the server 104 to access his emails which are encrypted with the public encryption key. In one example, the reception of the request constitutes a login session.

At the block 204, method 200 comprises sending a request by the server 104, via a secure communication interface 108, to a secure user device 106 to release a password stored on the user device 106. In one example, the password is stored in a secure chip of the secure user device 106. In one example, the secure communication interface 108 implements an SSL/TLS session via an application executed on the secure user device 106.

At block 206, method 200 comprises obtaining the password via the secure communication interface 108, from the user device 106, in response to a validated security test sent by the user device 106 to a user. For example, issuing the test may include comparing a biometric input with biometric data associated with the user stored on the secure user device 106, wherein the validated security test consists of determining that the biometric input meets a predefined similarity criterion with respect to the biometric data associated with the user. In one example, the test consists of comparing the user's fingerprint with a fingerprint associated with the user stored on the secure user device 106. In another example, the test may consist of a facial recognition or measurement of a vital sign (e.g., a pulse or breathing).

At block 208, the method consists of recovering, via the server 104, the user's encrypted private key which is encrypted with said the password, and decrypting the user's private key encrypted with the password to obtain the user's private key.

In block 210, the method comprises decrypting the digital data encrypted with the user's private key, and presenting the digital data to said user. For example, the user's emails can be decrypted with the user's decrypted private key and the user can access their emails.

Figure 3:
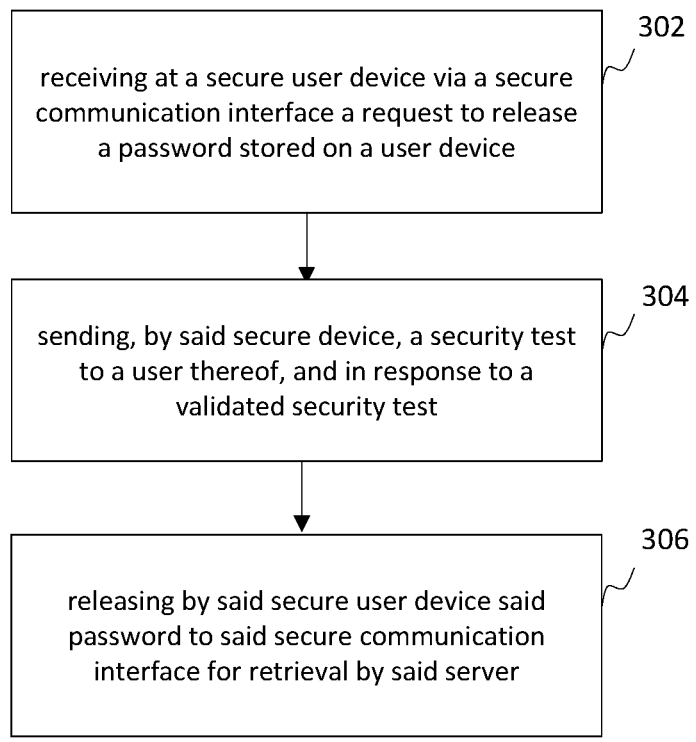
FIG. 3 shows an example of a method for secure access to digital data.

FIG. 3 illustrates a method 300 for secure access to digital data. The digital data is encrypted with a particular user's public encryption key and stored on a server. For example, method 300 may be implemented by the system 100 described above, and in particular, the destination unit 102, the server 104, the secure communication interface 108 and the user device 106 illustrated in FIG. 1.

At the block 302, method 300 consists of receiving a request at the secure user device 106, via the secure communication interface 108, to release a password stored on the secure user device 106. For example, the password is stored in a secure chip of the secure user device 106. The request is sent in response to receipt at the server 104 of a request from the user to access the digital data. In one example, the secure communication interface 108 implements an SSL/TLS session via an application executed on the secure user device 106.

At block 304, method 300 comprises transmitting, by the secure user device 108, a security test to a user thereof. For example, issuing the test may consist of comparing a biometric input with biometric data associated with the user stored on the secure user device 106, wherein the validated security test consists of determining that the biometric input meets a predefined similarity criterion with respect to the biometric data associated with the user. In one example, the test consists of comparing the user's fingerprint with reference biometric data associated with the user stored on the secure user device 106 (addition of facial control+measurement of the vital sign: pulse, respiration).

At block 306, method 300 comprises, in response to the validated security test, releasing the password by the secure user device 106 to the secure communication interface 108 for retrieval by the server 104, the password being used in the decryption of an encrypted private key to obtain the user's private key, and the decryption of the digital data encrypted with the user's private key, for presenting the digital data to the user.

In the examples of methods 200, 300 described above, the secure communication interface 108 can also perform an encryption and a decryption of the communications with a shared secret known to the secure user device 106 and to the interface 108. For example, before receiving a request at the secure user device 106, via the secure communication interface 108, to release the password stored on the user device 106, the shared secret may be transferred to the secure user device 106. Furthermore, the transfer of the shared secret to the secure user device 106 may comprise the scanning of an optical, magnetic or wireless-readable code.

In one example, before receiving at the server a request from the user to access the digital data, the secure communication interface 108 transmits the password to the secure user device 106 via a secure channel.

In addition, in the examples of methods 200, 300 described above, the public encryption key of the given user and the private key of the given user may be, for example, compliant with the S/MIME standard and defined by an S/MIME certificate.

Furthermore, in the examples of methods 200, 300 described above, the digital data may consist of a primary encryption key, and may also be associated with primary data encrypted with the primary encryption data, the method 200, 300 consisting of a subsequent step of decrypting the primary encryption data with the primary encryption key. In addition, the digital data is further associated with an encrypted copy of the primary encryption key, the encrypted copy of the primary encryption key being encrypted with an escrow password.

It should be understood that the implementations of the present invention may be implemented by a computer program product comprising instructions and being executed by a computer. For example, the methods 200, 300 may be implemented using computing devices, software, and/or a combination thereof. For example, the computing devices may be implemented using processing circuitry such as, but not limited to, a processor, a central processing unit (CPU), a controller, an arithmetic and logic unit (ALU), a digital signal processor, a microcomputer, a field, a programmable gate array (FPGA), a system on a chip (SoC), a programmable logic unit, a microprocessor, or any other device capable of responding to and executing instructions in a defined manner. The software may include a computer programme, programme code, instructions, or a combination thereof, for independently or collectively instructing or configuring a hardware device to operate as desired. The computer programme and/or programme code may include programme or computer-readable instructions, software components, software modules, data files, data structures, and/or the like, which may be implemented by one or more hardware devices, such as one or more of the aforementioned hardware peripherals. When a hardware device is a computer processing device (e.g., CPU, controller, ALU, digital signal processor, microcomputer, microprocessor, etc.), the computer processing device may be configured to execute programme code by performing arithmetic, logic, and input/output operations, according to the programme code. The control unit 106 may also comprise one or more storage devices. The storage device(s) may be tangible or non-transitory computer readable storage media, such as random access memory (RAM), read-only memory (ROM), permanent mass storage device (such as disk drive), (e.g. NAND flash) and/or any other similar data storage mechanism capable of storing and recording data. The storage device(s) may be configured to store computer programmes, programme code, instructions, or a combination thereof, for one or more operating systems, and/or to implement the examples of implementations described herein. The computer programmes, programme code, instructions, or combination thereof may also be loaded from a separate computer-readable storage medium into the storage device(s) and/or one or more computer processing devices using a drive mechanism. Such a separate computer-readable storage medium may comprise a USB (Universal Serial Bus) stick, a memory stick, a Blu-ray/DVD/CD-ROM player, a memory card and/or other computer-readable storage media.

As illustrated above, the invention allows the use of a simple system allowing access to data in a highly secure manner. Furthermore, the invention does not require the use of a multi-factor authentication protocol. The method of securely accessing digital data allows for easy configuration and use, as well as easy integration with non-compliant systems. The system described above does not use user passwords, which eliminates the need for the user to remember a string of letters and numbers. Additionally, a simple eight-character user password takes a brute-force computer anywhere from two hours to 21 days to crack, depending on the complexity of the phrase. Rather, the above system uses a 2048-bit hash that would take 15 billion years to decrypt using today's fastest computers. Furthermore, the system described above can use a secure hardware component such as a cryptographic chip in order to protect, store and prevent any attempt to extract this hash without biometric verification of the user On the contrary, other systems store passwords and encryption keys on the server, which can be accessed by the systems' administration or data centre personnel.

Although the invention has been illustrated and described in detail with the aid of preferred implementations, the invention is not limited to the examples disclosed. Other variants can be deduced by those skilled in the art without departing from the scope of protection of the claimed invention. For example, the destination unit 102, the server 104, the secure communication interface 108 and the user device 106 have been described as being different units. In another example, two or more of these units may be the same unit. For example, the secure communication interface 108 and the destination unit 102 may be the same unit such as a user's smart phone or tablet. In another example, the server 104 and the secure communication interface 108 can be the same unit in which the transfers described above are automated.

The invention claimed is:

1. A method for secure access to digital data, with said digital data being encrypted with a given user's public encryption key and stored on an email server, and said method consisting of the following steps:
   A. receiving at said email server a request from said user to access said digital data;
   B. sending, by said email server via a secure communication interface, a request to a secure user device to release a hash stored on said user device;
   C. obtaining said hash via said secure communication interface, from said user device in response to a validated security test issued by said user device to a user; and
   D. retrieving, via said email server, the user's encrypted private key, said user's private key being encrypted with said hash, and decrypting said user's encrypted private key with said hash to obtain that user's private key, and decrypting said encrypted digital data with said user's private key, and presenting said digital data to said user.

2. The method according to claim 1, in which step A constitutes a login session, the method comprising a subsequent step consisting of deleting said private key and said hash from a memory of said email server when the session is considered to be finished.

3. A method for secure access to digital data, with said digital data being encrypted with a given user's public encryption key and stored on an email server, and said method consisting of the following steps:
   A. receiving a request on a secure user device, via a secure communication interface, to release a hash stored on said user device, said request being sent in response to receiving at said email server a request from said user to access said digital data;
   B. issuing, by said secure device, a security test to a user thereof, and in response to the validated security test, releasing by said secure user device said hash to said secure communication interface for recovery by said email server, said hash being used in decrypting an encrypted private key to obtain said user's private key, and decrypting said encrypted digital data with said user's private key, for presentation of said digital data to said user.

4. The method according to claim 1, 2, or 3, wherein said step of issuing a security test by said secure user device consists of comparing a biometric input with biometric data associated with the said user stored on said secure user device, wherein said validated security test consists of determining whether said biometric input satisfies a predefined similarity criterion with respect to said biometric data associated with said user.

5. The method according to claim 4 wherein the hash is stored in a secure chip of said secure user device.

6. The method according to claim 4 wherein said secure communication interface implements an SSL/TLS session via an application running on said secure user device.

7. The method according to claim 4 wherein said secure communication interface further performs encryption and decryption of communications with a shared secret known to said secure user device and said interface.

8. The method according to claim 7 comprising an additional step, before step A, which consists of transferring said shared secret to said secure user device.

9. The method according to claim 8 wherein the aforementioned step of transferring said shared secret to said secure user device consists of scanning an optical, magnetic or wireless readable code.

10. The method according to claim 4 wherein the aforementioned public encryption key of said given user and said private key of the given user conform to the S/MIME standard and are defined by an S/MIME certificate.

11. The method according to claim 4 wherein said digital data comprises a primary encryption key, and is further associated with primary data encrypted with said primary encryption data, said method comprising a subsequent step of decrypting said primary encryption data with said primary encryption key.

12. The method according to claim 11 in which the said digital data is further associated with an encrypted copy of said primary encryption key, said encrypted copy of said primary encryption key being encrypted with an escrow password.

13. The method according to claim 4, wherein, prior to said step A, said secure communication interface sends said hash to said secure user device via a secure channel.

14. A computer programme product embodied on a non-transitory computer readable storage medium consisting of instructions which, when the programme is executed by a computer, cause the computer to implement the method of claim 4.

15. A system allowing secure access to digital data, with said digital data being encrypted with a given user's public encryption key, and the system comprising:
   a destination unit configured to receive the digital data;
   an email server configured to store the user's public encryption key and receive a request from said user to access said digital data;
   a user device configured to store a hash; and
   a secure communication interface configured to send a request to the secure user device to release the hash and obtain said hash from said user device in response to a validated security test sent by said user device to a user, wherein the email server is configured to retrieve the user's encrypted private key, said user's private key being encrypted with said hash, and decrypting said user's encrypted private key with said hash to obtain that user's private key, and decrypting said encrypted digital data with said user's private key, and presenting said digital data to said user.

16. A system allowing secure access to digital data, with said digital data being encrypted with a given user's public encryption key, and the system comprising:
   an email server configured to store the user's public encryption key; and
   a secured user device configured to receive via secure communication interface a request to release a hash stored on said user device, said request being sent in response to receiving at said email server a request from said user to access said digital data, send a security test to a user thereof, and in response to the validated security test, to release said hash to said secure communication interface for retrieval by said email server, said hash being used in the decryption of an encrypted private key to obtain the private key of said user, and the decryption of said digital data encrypted with said user's private key, for the presentation of said digital data to said user.

* * * * *